(12) United States Patent
Yaghmur et al.

(10) Patent No.: US 8,158,687 B2
(45) Date of Patent: Apr. 17, 2012

(54) OIL-IN-WATER EMULSION FOR DELIVERY

(75) Inventors: Anan Yaghmur, Graz (AT); Liliana De Campo, Act (AU); Laurent Sagalowicz, Cully (CH); Martin Leser, Bretigny (CH); Otto Glatter, Graz (AT); Martin Michel, Lausanne (CH); Heribert Johann Watzke, Lausanne (CH)

(73) Assignee: Nestec S.A., Vevey (CH)

( * ) Notice: Subject to any disclaimer, the term of this patent is extended or adjusted under 35 U.S.C. 154(b) by 376 days.

(21) Appl. No.: 11/569,338

(22) PCT Filed: May 18, 2005

(86) PCT No.: PCT/EP2005/005411
§ 371 (c)(1),
(2), (4) Date: Jan. 30, 2007

(87) PCT Pub. No.: WO2005/110370
PCT Pub. Date: Nov. 24, 2005

(65) Prior Publication Data
US 2007/0213234 A1    Sep. 13, 2007

(30) Foreign Application Priority Data

May 18, 2004 (EP) .................... 04011749
Sep. 16, 2004 (EP) .................... 04022046

(51) Int. Cl.
*C09K 3/00* (2006.01)
*A61K 9/107* (2006.01)
(52) U.S. Cl. .................... 516/56; 426/89
(58) Field of Classification Search ............ 516/56; 426/89
See application file for complete search history.

(56) References Cited

U.S. PATENT DOCUMENTS

| 5,531,925 A * | 7/1996 | Landh et al. ............. 252/299.01 |
| 2003/0232095 A1 * | 12/2003 | Garti et al. .................... 424/725 |
| 2004/0022861 A1 * | 2/2004 | Williams et al. .............. 424/489 |
| 2008/0255247 A1 | 10/2008 | Sagalowicz et al. |

FOREIGN PATENT DOCUMENTS

| JP | 2004008837 | 1/2004 |
| JP | 2004-514690 | 5/2004 |
| JP | 2009-516724 | 4/2009 |
| WO | WO 99/63841 | 12/1999 |
| WO | WO 00/59475 | 10/2000 |
| WO | 0243696 | 6/2002 |
| WO | WO 02/076441 | 10/2002 |
| WO | WO 03/105607 | 12/2003 |

OTHER PUBLICATIONS

Praveen et al. (Effect of anti-inflammatories on Pluronic® F127: micellar assembly, gelation and partitioning, available online Jun. 1, 2004, International Journal of Pharmaceutics 278 (2004) 361-377).*
Monduzzi, M. et al., "A 13-C NMR Study of Aqueous Dispersions of Reversed Lipid Phases," USAmerican Chemical Society, vol. 16, pp. 7355-7358 (2000).
Nakano, M. et al., "Small-Angle X-Ray Scattering and 13-C NMR Investigation on the Internal Structure of "Cubosomes"," USAmerican Chemical Society, vol. 17, pp. 3917-3922 (2001).
Gustafsson, J. et al., "Submicron Particles of Reversed Lipid Phases in Water Stabilized by a Nonionic Amphiphilic Polymer," USAmerican Chemical Society, vol. 13, pp. 6964-6971 (1997).
Nakano, M. et al., "Dispersions of Liquid Crystalline Phases of the Monolein/Oleic Acid/Pluronic F127 System," USAmerican Chemical Society, vol. 18, pp. 9283-9288 (2002).
Drummond, C.J. et al., "Surfactant Self-Assembly Objects as Novel Drug Delivery Vehicles," Current Opinion in Colloid and Interface Science, vol. 4, pp. 449-456 (2000).

* cited by examiner

*Primary Examiner* — Ling Choi
*Assistant Examiner* — Chun-Cheng Wang
(74) *Attorney, Agent, or Firm* — K&L Gates LLP

(57) ABSTRACT

The present invention concerns an oil-in-water emulsion wherein the oil droplets of a diameter in the range of 5 nm to hundreds of micrometers exhibit a nano-sized structurization with hydrophilic domains with a diameter size in the range of 0.5 to 200 nm and being formed by a lipophilic additive.

8 Claims, 18 Drawing Sheets

1.32wt% tetradecane-3.3wt% MLO
1.74wt% tetradecane-2.9wt% MLO

OIL-IN-WATER EMULSION FOR DELIVERY

FIELD OF INVENTION

The present invention concerns an oil-in-water emulsion in which the dispersed oil droplets exhibit a self-assembled nano-structure.

BACKGROUND OF THE INVENTION

Emulsions in Industry

Emulsions are common colloidal systems in many industrial products such as Food, Cosmetics or Pharmaceutical preparations. They are made of oil droplets which are dispersed in an aqueous continuous phase. The dispersed oil droplets are stabilised by surface active molecules which form an adsorption layer around the oil droplets. In order to disperse the oil phase into the continuous aqueous phase, homogenisers are used which enable to produce oil droplets in various size ranges (having a radius from ca 100 nm up to several hundreds of micrometers). The formation of the adsorption layer around the oil droplets during the homogenisation step renders the oil droplets kinetically stable against coalescence, flocculation or coagulation. The surface active material used in oil-in-water based emulsion products can either be low molecular weight hydrophilic surfactants, such as polysorbates, lysolecithins, monoglyceride derivatives etc, or polymers, such as proteins, e.g. gelatin or from milk, soya, or polysaccharides, such as gum arabic or xanthan or mixtures thereof.

Oil-in-water emulsion based products are ubiquitous in—Food, Cosmetics or Pharmaceuticals. Prominent oil-in-water emulsion-based food products are for instance milk, mayonnaise, salad dressings, or sauces. Prominent oil-in-water emulsion-based products used in the cosmetical or pharmaceutical Industry are lotions, creams, milks, pills, tablets etc. The oil droplets in such products are usually made of, for instance, triglycerides, diglycerides, waxes, fatty acid esters, fatty acids, alcohols, mineral oils, or hydrocarbons.

Emulsions are used either as a starting material, intermediate or final product or as an additive to a final product.

Emulsions for Delivery

One of the uses of emulsions in Industry is to deliver active compounds, such as, flavours, vitamins, antioxidants, neutraceuticals, phytochemicals, drugs, etc. Administrating of the active components requires the use of an appropriate vehicle for bringing an effective amount of the active component into the desired place of action. Oil-in-water emulsions are commonly used delivery systems since they take advantage of the increased solubility of lipophilic active compounds in the oil. In EP 1116515, as an example of using emulsions for controlling flavour performance, a hydrophobic active ingredient, such as a flavour component, is mixed into a matrix via an extruder in form of an oil-in-water emulsion in order to increase the stability of the introduced active ingredient during further processing of the product. In WO 00/59475, as an example for a pharmaceutical oil-in-water emulsion, a composition and method for improved delivery of ionizable hydrophobic therapeutic agents is described, which are mixed together with an ionizing agent, a surfactant and a triglyceride to form an oil-in-water emulsion. WO 99/63841, as an example for the use of emulsions in the food area, describes compositions comprising phytosterol having enhanced solubility and dispersability in an aqueous phase due to the formation of an emulsion or a microemulsion.

Furthermore, if the oil droplets in the oil-in-water emulsions are ultra small, e.g. in the order of several nanometers to about 200 nm diameter, the emulsion is called oil-in-water microemulsion or nano-emulsion (Evans, D. F.; Wennerström, H. (Eds.); 'The Colloidal Domain', Wiley-VCH, New York, (1999)). These emulsions are clear and thermodynamically stable and, therefore, are for the man skilled in the art different from ordinary emulsions the latter being thermodynamically unstable and generally turbid.

Another type of a delivery system are surfactant mesophase particles described by Gustafsson et al. (Gustafsson, J.; Ljusberg-Wahren, H.; Almgren, M.; Larsson, K.; Langmuir (1997), 13, 6964-6971).

DESCRIPTION OF THE INVENTION

As state of the art, dispersed oil droplets in oil-in-water emulsions are used as vehicles for lipophilic molecules which are dissolved in the oil droplets. The drawback of this kind of emulsions as a vehicle system is that they are not able to host crystallinic (i.e., present in a crystalline form), hydrophilic or slightly amphiphilic molecules alone or in combination with lipophilic compounds due to the lack of molecular solubility of the active agents in the oil phase. Especially difficult is the delivery of crystallinic or amphiphilic or hydrotrope compounds because of their tendency to disturb the stabilizing function of the emulsifiers, and, as a consequence, they can destabilize the emulsion.

The present invention is based on the finding of novel nano-sized self-assembled structures in the interior of ordinary oil droplets. The structures are formed by the addition of a lipophilic additive (LPA) to the oil droplets. Such structures can solubilize not only lipophilic components but also in the same time hydrophilic and/or amphiphilic or hydrotropic or crystallinic components. The nano-sized self-assembled structures inside the oil droplets mainly consist of nano-sized and thermodynamically stable hydrophilic domains, i.e., water droplets, rods or channels. The nano-sized domains, which are formed spontaneously (thermodynamically driven) inside the emulsion oil droplets, are stabilized by the LPA. The hydrophilic part of the LPA molecule is part of the hydrophilic domain structure. The hydrophilic domains can be of the size of 0.5 to 200 nm of diameter, preferably in the range of 0.5 to 150 nm of diameter, even more preferably in the range of 0.5 to 100 nm of diameter, and most preferably in the range of 0.5 to 50 nm.

As used herein, the 'hydrophilic domain' consists of the water domains and the hydrophilic headgroup area of the LPA molecules. Due to their ultra-small size, they also exhibit a large surface area which is a suitable location for the solubilization of a variety of different compounds.

The emulsions of this invention are clearly distinguished from emulsions commonly known as water-oil-water double emulsions. w/o/w (water/oil/water) double emulsions are oil-in-water emulsions, in which the oil droplets contain micron-sized water droplets (Garti, N.; Bisperink, C.; Curr. Opinion in Colloid & Interface Science (1998), 3, 657-667). The water droplets inside the dispersed double emulsion oil droplets are prepared (dispersed) by mechanical energy input, e.g., homogenisation, and, as a consequence, are thermodynamically unstable and not self-assembled. The diameter of the inner water droplets in a w/o/w double emulsion are larger than 300 nm diameter. The emulsions of this invention can easily be distinguished from ordinary w/o/w double emulsions since the formation of the nano-sized self-assembled structure inside the oil droplets of the emulsion of this invention is spontaneous and thermodynamically driven, and the mean diameter of the water droplets or channels is below 200 nm.

Thus the invention is directed towards oil droplets which contain a nano-sized self-assembled structure with hydrophilic domains. The notion 'self-assembly' or 'self-organization' refers to the spontaneous formation of aggregates (associates) or nano-structures by separate molecules. Molecules in self-assembled structures find their appropriate location based solely on their structural and chemical properties due to given intermolecular forces, such as hydrophobic, hydration or electrostatic forces (Evans, D. F.; Wennerström, H. (Eds.); 'The Colloidal Domain', Wiley-VCH, New York, (1999)). The result of self-assembly does not depend on the process itself and corresponds to a state of minimum energy (stable equilibrium) of the system.

JP 2004 008837 discloses an oil in water emulsion which contains water-soluble solid particles present in the oil droplets. The particles are in the size range of 20 nm to 10 µm. The particles are prepared in a water-in-oil (w/o) emulsion by means of dehydration (i.e., not a spontaneous process) before the whole particle/oil (S/O) suspension is dispersed in an aqueous phase using the porous membrane emulsification process.

WO 02/076441 discloses the use of an alcohol-in-fluorcarbon microemulsion as a precursor for the preparation of solid nanoparticles. The nanoparticles have a diameter below 200-300 nanometers. Nanoparticle formation is not spontaneous and triggered by cooling the precursor microemuslion below about 35° C., or by evaporating the alcohol in the precursor microemulsion or by diluting the microemulsion with a suitable polar solvent.

US 2004/022861 discloses a w/o/w double emulsion, in which the oil droplets containing an aqueous microscopic water phase containing protein or another hydrophilic agent. The whole double emulsion is sprayed into, for instance, liquid nitrogen via a capillary nozzle for production of protein-loaded microparticles.

All these examples describe the non-spontaneous formation of solid hydrophilic (nano)particles using w/o microemulsions or w/o or w/o/w double emulsions and needing an external trigger for the solidification of the hydrophilic domains inside the oil droplets. After preparation of the (nano)particles they are largely unaffected by environmental factors such as temperature, pH, or external fluid properties. It has to be mentioned that ordinary w/o microemulsions in which the water droplets are not solidified, i.e. fluid, are largely affected by such environmental factors.

Numerous scientific research has shown that the type of emulsion (o/w or w/o) formed by homogenization of the respective Winsor system (Winsor I (o/w microemulsion plus excess of oil) or Winsor II (w/o microemulsion plus excess of water)) is the same as that formed in the microemulsion phase which is in equilibrium of its excess continuous phase. For instance, emulsification of a w/o microemulsion plus excess water (Winsor II system) gives at sufficiently high surfactant concentrations, i.e., larger than the critical concentration of the surfactant in the oil phase $c\mu c_{oil}$, a w/o emulsion, the continuous phase of which is itself a w/o microemulsion (B. P. Binks, Langmuir (1993) 9, 25-28). This means that when an ordinary w/o microemulsion is diluted with an aqueous phase the formation of a w/o emulsion is preferred over the formation of an o/w emulsion. Binks et al. (B. P. Binks, Langmuir (1993) 9, 25-28) explained this behaviour in terms of the partitioning of the surfactant between the water and oil phase in relation to Bancroft's rule (W. D. Bancroft, J. Phys. Chem. (1913) 17, 501): if the surfactant is accumulated in the oil phase, i.e., better soluble in the oil than in the aqueous phase, the formed type of emulsion is always of the w/o and not the o/w-type. In order to form an o/w emulsion from a w/o microemulsion or a Winsor II system (w/o microemulsion plus excess water), it is necessary that the surfactant undergoes a phase inversion, i.e., a change of its solubility from oil-soluble (formation of the w/o emulsion) to water-soluble (formation of a o/w emulsion) (P. Izquierdo et al., Langmuir (2002) 18, 26-30). Using nonionic surfactants such as alkylethoxylates, e.g. the $C_{12}EO_4$, this can be achieved by cooling the system from 40-50° C. (PIT temperature) down to 25° C. This is completely different from the present invention which correlates the phase behaviour of a lipophilic additive (LPA; forms a w/o microemulsion at room temperature) to the formation of an o/w emulsion in which the oil droplets, containing hydrophilic domains, are stabilized by an ordinary water-soluble emulsifier. In this case the hydrophilic domains are fluid and not solid. The w/o microemulsion or the oil containing the hydrophilic domains can be diluted (dispersed) in an aqueous phase without undergoing a phase inversion and loosing the hydrophilic domains inside the dispersed oil droplets and without the necessity of solidifying the internal hydrophilic domains in the oil droplets before the dispersion step.

According to the invention, the spontaneous formation of the nano-sized self-assembled structure inside the oil droplets can be realised in different ways. One way is to add a lipophilic additive (LPA), that allows the spontaneous formation of the nano-sized self-assembled structure, to the oil phase prior to the homogenisation step. The other way is to add the lipophilic additive (LPA) to the emulsion product before or after the homogenisation step. In this case the lipophilic additive will dissolve into the oil droplets and will lead to the spontaneous formation of the nano-sized self-assembled structure inside the oil droplets. As homogeniser, an ordinary industrial or lab-scale homogeniser, such as a Rannie piston homogeniser, a Kinematica rotor stator mixer, a colloid mill, a Stephan mixer, a Couette shear cell or a membrane emulsification device can be taken. Moreover, ultrasound, steam injection or a kitchen mixer are also suitable to produce the emulsion described in this invention. The spontaneous formation of the nano-sized self-assembled structure inside the oil droplets is independent on the energy intake, used to make the emulsion, and the sequence of LPA addition. This means that also Microfluidics technics are suitable to make the emulsion of this invention.

Another route for making the emulsion of this invention is the use of hydrotropes or water structure breakers, or spontaneous emulsification which can be chemically or thermodynamically driven (Evans, D. F.; Wennerström, H. (Eds.); 'The Colloidal Domain', Wiley-VCH, New York, (1999)).

Another route for making the emulsion of this invention is by combining the spontaneous formation of the nano-sized self-assembled structure inside the oil droplets with the spontaneous formation of the oil droplets, i.e., the entire emulsion of this invention, by adding diblockcopolymer- or apoprotein-like biopolymers, such as protein-polysaccharide conjugates or coacervates or protein-polysaccharide, protein-protein, or polysaccharide-polysaccharide hybrides or mixtures of polymers or biopolymers or low molecular weight surfactants.

Emulsion Formulation

The present invention concerns an oil-in-water emulsion, wherein the oil droplets (having a diameter in the range of 5 nm to hundreds of micrometers) exhibit a nano-sized structurisation with hydrophilic domains being formed by a lipophilic additive (LPA). The LPA can be added as such or made in situ by chemical, biochemical, enzymatic or biological means. The amount of oil droplets present in the emulsion of this invention (oil droplet volume fraction) is the amount generally used in ordinary oil-in-water emulsion products.

More precisely, the present invention is directed to oil-in-water emulsions comprising dispersed oil droplets having a nano-sized self-assembled structured interior comprising
- (i) an oil selected from the group consisting of mineral oils, hydrocarbons, vegetable oils, waxes, alcohols, fatty acids, mono-, di- or tri-acylglycerols, essential oils, flavouring oils, lipophilic vitamins, esters, neutraceuticals, terpins, terpenes and mixtures thereof,
- (ii) a lipophilic additive (LPA) or mixtures of lipophilic and hydrophilic additives, having a resulting HLB value (Hydrophilic-Lipophilic Balance) lower than about 10, preferably lower than 8.
- (iii) hydrophilic domains in form of droplets, rods or channels comprising of water or a non-aqueous polar liquid, such as a polyol, and
- an aqueous continuous phase, which contains emulsion stabilizers or emulsifiers.

As used herein, a 'lipophilic additive' (abbreviated also as 'LPA') refers to a lipophilic amphiphilic agent which spontaneously forms stable nano-sized self-assembled structures in a dispersed oil phase. The lipophilic additive (mixture) is selected from the group consisting of fatty acids, sorbitan esters, propylene glycol mono- or diesters, pegylated fatty acids, monoglycerides, derivatives of monoglycerides, diglycerides, pegylated vegetable oils, polyoxyethylene sorbitan esters, phospholipids, cephalins, lipids, sugar esters, sugar ethers, sucrose esters, polyglycerol esters and mixtures thereof.

According to the first embodiment of the invention the oil-in-water emulsion exhibits oil droplets having an internal structure taken from the group consisting of the $L_2$ structure or a combination of a L2 and oil structure (microemulsion or isotropic liquid droplets) in the temperature range of 0° C. to 100° C.

According to the second embodiment of the invention, the oil-in-water emulsion exhibits oil droplets having a L2 structure (microemulsion or isotropic liquid droplets) in the temperature range of 0° C. to 100° C.

According to a third embodiment of the invention, the oil-in-water emulsion exhibits oil droplets having an internal structure taken from the group consisting of the L2 structure (microemulsion or isotropic liquid droplets) or liquid crystalline (LC) structure (e.g. reversed micellar cubic, reversed bicontinuous cubic or reversed hexagonal) and a combination thereof in the temperature range of 0° C. to 100° C.

According to the fourth embodiment of the invention, the oil-in-water emulsion exhibits oil droplets having a LC internal structure in the temperature range of 0° C. to 100° C.

According to a fifth embodiment of the invention, the oil-in-water emulsion exhibits oil droplets having an internal structure taken from the group consisting of the L3 structure, a combination of the L2 and L3 structure, a combination of the lamellar liquid crystalline (Lα) and L2 structure, and a combination of the lamellar crystalline and L2 structure in the temperature range of 0° C. to 100° C.

According to a sixth embodiment of the invention, the oil-in-water emulsion exhibits oil droplets having an internal structure which is a combination of the previously described structures in the temperature range of 0° C. to 100° C.

All above mentioned internal structures can be without doubt determined by SAXS analysis and by cryo-TEM (Qiu et al. Biomaterials (2000) 21, 223-234, Seddon. Biochimica et Biophysica Acta (1990) 1031, 1-69, Delacroix et al. J. Mol. Biol. (1996) 258, 88-103, Gustafsson et al. Langmuir (1997) 13, 6964-6971, Portes. J. Phys: Condens Matter (1992) 4, 8649-8670) and fast Fourier Transform (FFT) of cryo-TEM images.

For certain applications, the use of temperatures higher than 100° C. (for example retorting temperature) is also possible and is covered by the present invention. The lipophilic additive (LPA) can also be mixed with a hydrophilic additive (having a HLB larger than 10) up to the amount that the mixture is not exceeding the overall HLB of the mixture of 10 or preferably 8. The additive (mixture) can also be made in-situ by chemical, biochemical, enzymatic or biological means.

The amount of added lipophilic additive is defined as $\alpha$. $\alpha$ is defined as the ratio LPA/(LPA+oil)×100. $\alpha$ is preferably higher than 0.1, more preferably higher than 0.5, even more preferably higher than 1, even more preferably higher than 3, even more preferably higher than 10 and most preferably higher than 15. The ratio $\alpha$=LPA/(LPA+oil)*100 is preferably lower than 99.9, more preferably lower than 99.5, even more preferably lower than 99.0, even more preferably lower than 95, even more preferably lower than 84 and most preferably lower than 70. Any combination of the lower and upper range is comprised in the scope of the present invention. $\alpha$ can be given either in wt-% or mol-%. The lower and higher limit of $\alpha$ depends on the properties of the taken oil and LPA, such as the polarity, the molecular weight, dielectric constant, etc., or physical characteristics such as the critical aggregation concentration of the LPA in the oil droplet phase.

The emulsion is stabilized by an emulsifier (also called primary emulsifier) suitable to stabilize ordinary oil-in-water emulsion droplets. The emulsion can be aggregated (flocculated) or not depending on the used emulsifier. The emulsifier is selected from the group consisting of low molecular weight surfactants having a HLB>8, gelatin, proteins from e.g. milk or soya, peptides, protein hydrolisates, block co-polymers, surface active hydrocolloids such as gum arabic, xanthan gum, diblockcopolymer- or apoprotein-like biopolymers, such as protein-polysaccharide conjugates or coacervates, or protein-polysaccharide, protein-protein, or polysaccharide-polysaccharide hybrids, conjugates or coacervates or mixtures of polymers and biopolymers.

The emulsifier can also be mixed with the LPA, or with the oil, or with the LPA and the oil. This means, that the emulsifier can partly also be present in the interior of the oil droplet and affecting the internal nano-sized self-assembled structure.

The ratio $\beta$=emulsifier/(LPA+oil+emulsifier)×100 describes the amount of emulsifier used to stabilize the oil droplets with respect to the oil plus LPA content. $\beta$ is preferably higher than 0.1, more preferably higher than 0.5, more preferably higher than 1, and more preferably higher than 2.

The ratio $\beta$=emulsifier/(LPA+oil+emulsifier)×100 is preferably lower than 90, more preferably lower than 75 and even more preferably lower than 50. Any combination of the lower and upper range is comprised in the scope of the present invention. $\beta$ can be given either in wt-% or mol-%. The lower and higher limit of $\beta$ depends on the properties of the taken emulsifier, oil and LPA.

Various active components can be solubilized in the nano-sized self-assembled structured interior of the oil droplets. They can be oil-soluble, oil non-soluble, crystallinic or water soluble components selected from the group consisting of nutraceuticals, such as lutein, lutein esters, β-carotene, tocopherol, tocopherol acetate, tocotrienol, lycopene, $Co-Q_{10}$, flax seed oil, lipoic acid, vitamin $B_{12}$, vitamin D, α- and γ-polyunsaturated fatty acids, phytosterols, flavonoids, vitamin A, vitamin C or its derivatives, sugars, food supplements, functional ingredients, food additives, plant extracts, medicaments, drugs, pharmacologically active components, cosmetically active components, peptides, proteins or carbohydrates, aroma, salts and flavours.

In the oil-in-water emulsion according to the invention, the lipophilic additive is selected from the group consisting of myristic acid, oleic acid, lauric acid, stearic acid, palmitic acid, PEG 1-4 stearate, PEG 2-4 oleate, PEG-4 dilaurate, PEG-4 dioleate, PEG-4 distearate, PEG-6 dioleate, PEG-6 distearate, PEG-8-dioleate, PEG-3-16 castor oil, PEG 5-10 hydrogenated castor oil, PEG 6-20 corn oil, PEG 6-20 almond oil, PEG-6 olive oil, PEG-6 peanut oil, PEG-6 palm kernel oil, PEG-6 hydrogenated palm kernel oil, PEG-4 capric/caprylic triglyceride, mono, di, tri, tetraesters of vegetable oil and sorbitol, pentaerythrityl di, tetra stearate, isostearate, oleate, caprylate or caprate, polyglyceryl-3 dioleate, stearate, or isostearate, polyglyceryl 4-10 pentaoleate, polyglyceryl 2-4 oleate, stearate, or isostearate, polyglyceryl 4-10 pentaoleate, polyglyceryl-3 dioleate, polyglyceryl-6 dioleate, polyglyceryl-10 trioleate, polyglyceryl-3 distearate propylene glycol mono- or diesters of $C_6$ to $C_{20}$ fatty acid, monoglycerides of $C_6$ to $C_{20}$ fatty acid, lactic acid derivatives of monoglycerides, lactic acid dericatives of diglycerides, diacetyl tartaric ester of monoglycerides, triglycerol monostearate cholesterol, phytosterol, PEG 5-20 soya sterol, PEG-6 sorbitan tetra, hexasterarate, PEG-6 sorbitan tetraoleate, sorbitan monolaurate, sorbitan monopalmitate, sorbitan mono trioleate, sorbitan mono and tristearate, sorbitan monoisostearate, sorbitan sesquioleate, sorbitan sesquistearate, PEG-2-5 oleyl ether, POE 2-4 lauryl ether, PEG-2 cetyl ether, PEG-2 stearyl ether, sucrose distearate, sucrose dipalmitate, ethyl oleate, isopropyl myristate, isopropyl palmitate, ethyl linoleate, isopropyl linoleate, poloxamers, phospolipids, lecithins, cephalins, oat lipids and lipophilic amphiphilic lipids from other plants; and mixtures thereof.

The oil-in-water emulsion according to the invention is normally in liquid form. According to another embodiment of the invention, the emulsion is dried and is available in powder form.

The oil-in-water emulsion according to the invention is either a final product or an additive. The amount of the additive in the final product is not critical and can be varied.

The emulsion described in this invention is a novel type of emulsion which we name 'ISAMULSION' to describe the specific nature of the oil droplets containing a structure being Internally Self-Assembled, and to exclude the emulsion of this invention from ordinary oil-in-water or w/o/w double emulsions, including nano- and microemulsions, in which the oil droplets do not have a nano-sized self-assembled structure with hydrophilic domains. The ISAMULSION droplets basically consist of oil droplets which have a nano-sized self-assembled structure with hydrophilic domains. This structure can be of a lamellar liquid crystalline, or a lamellar crystalline, or of a reversed nature comprising the L2, the microemulsion, the isotropic liquid phase, the hexagonal, the micellar cubic, or the bicontinous cubic phase. The structures in the oil phase can appear as a single nano-structure or as a mixture of different nano-structures.

It is, therefore, an object of this invention to provide a new oil-in-water emulsion formulation which can be used for the delivery of active and/or functional ingredients in the Food, Pet Food, Neutraceutical, Functional Food, Nutri-cosmetical, Cosmetical, Pharmaceutical, Drug Delivery or Agro-chemical Industry.

BRIEF DESCRIPTION OF THE DRAWINGS

FIG. 1 represents the typical sequence of structures found in the interior of the dispersed oil droplets of the ISAMULSION as a function of the content of the lipophilic additive in % (% LPA=$\alpha$=100*LPA/(LPA+OIL)) and temperature. L2 denotes a reversed microemulsion-like structure; LC denotes the existence of a liquid crystalline phase or a mixture of different liquid crystalline phases. As FIG. 1 shows, a defined nano-sized self-assembled structure is formed at a given temperature and a specific amount of added lipophilic additive ($\alpha$ value) inside the oil droplets (for a closer description of the mentioned structures, see Evans, D. F.; Wennerström, H. (Eds.); 'The Colloidal Domain', Wiley-VCH, New York, (1999)). The amount of added LPA allows to precisely control the type of self-assembly structure, amount of water present in the hydrophilic domains, the amount of internal interface and the size, dimension, of the self-assembly nano-structure formed inside the ISAMULSION droplets. Depending on the oil-type and type of lipophilic additive (LPA), the minimum amount of LPA ($\alpha$) needed to initiate the spontaneous formation of the self-assembled internal droplet structure is between 0.1 and 15 wt-% on the oil phase.

The internal nano-sized self-assembled structure of the oil droplets in the emulsion can be detected by means of Cryo Transmission Electron Microscopy or SAXS.

Figure 1:
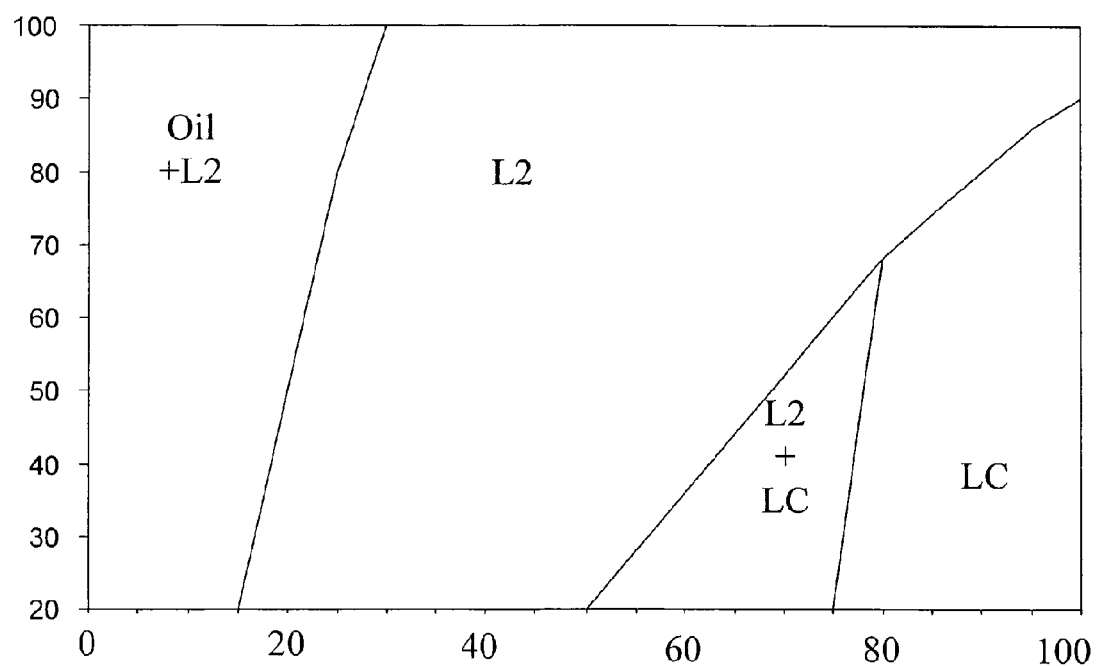
FIG. 1 shows the structure found in the interior of the ISAMULSION oil droplets as a function of $\alpha=100*$ LPA/(LPA+oil)
Figure 2:
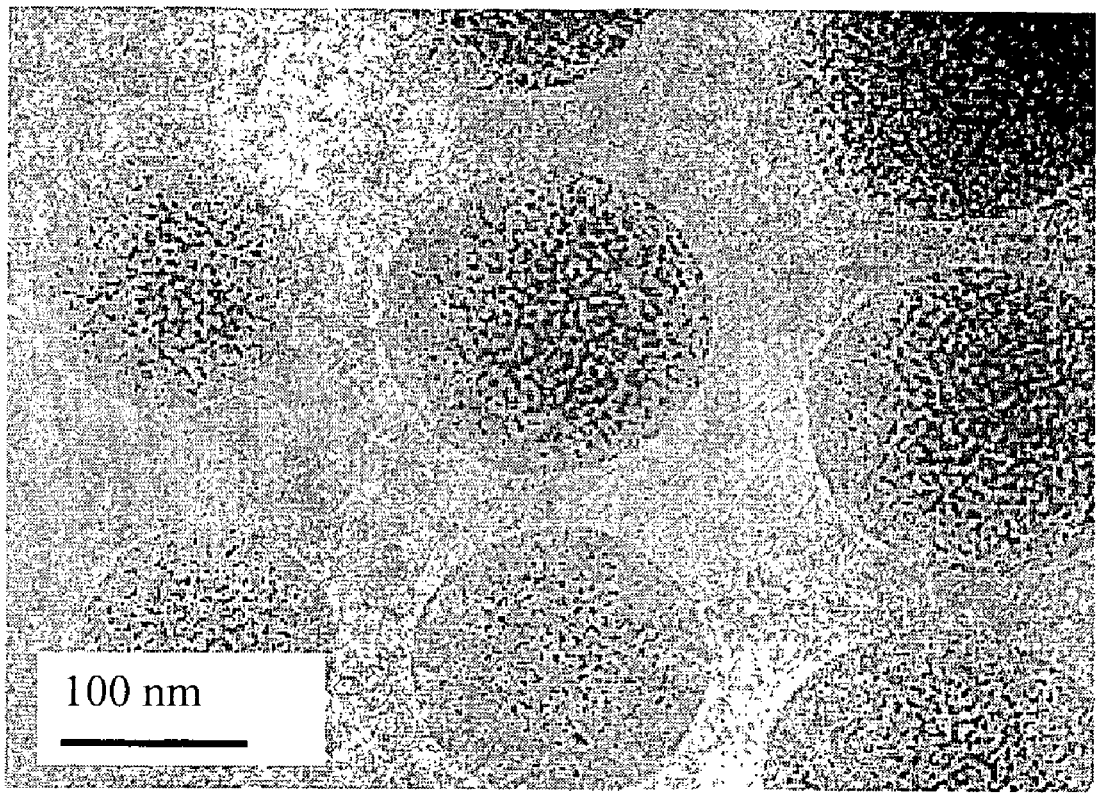
FIG. 2 shows a Cryo-TEM micrograph of a typical ISAMULSION.
Figure 7:
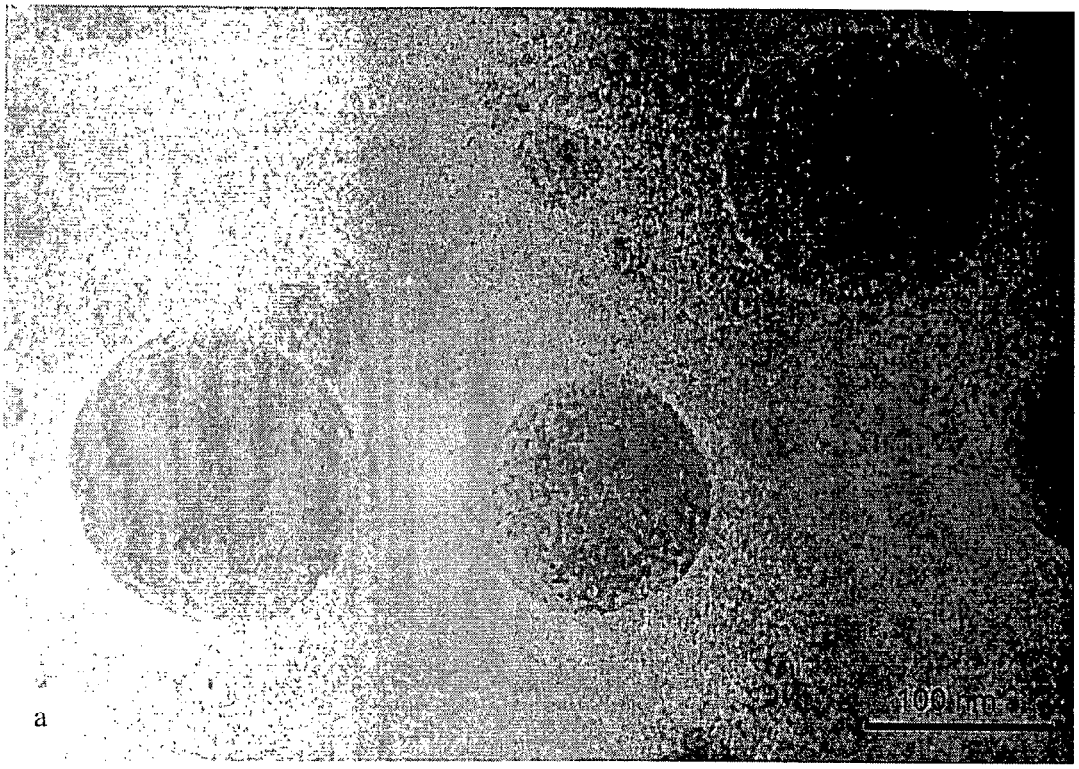
FIG. 7 shows a cryo TEM image of ISAMULSION oil droplets (in the presence of a LPA, with nano-structure) (a) in comparison to the corresponding ordinary emulsion droplets (in the absence of a LPA, without nano-structure) (b). Notice that the internal structure that is visible inside the ISAMULSION droplets (FIG. 7a) is invisible in the normal oil droplets (FIG. 7b).
Figure 7:
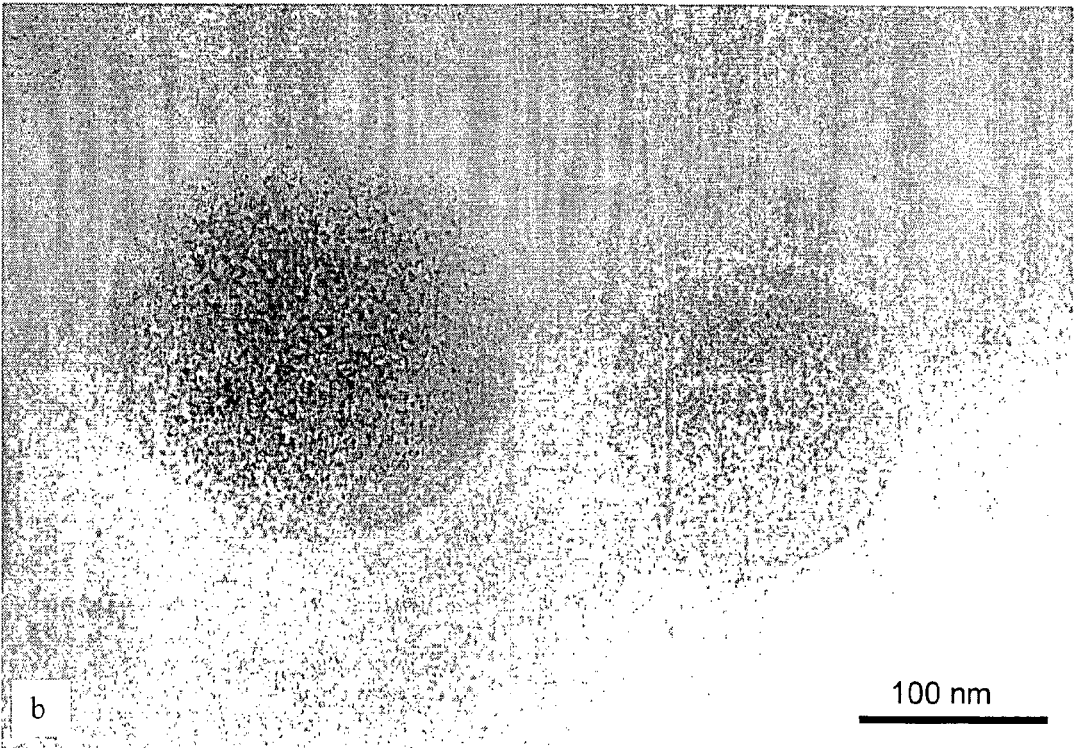

The cryo TEM image of FIG. 2 was obtained using the standard technique of Adrian et al (Adrian et al. Nature, (1984) 308, 32-36). A home made guillotine was used for sample freezing. A droplet of 3 μl sample dispersion was deposited onto a copper grid covered with a holy carbon film containing holes of about 2 μm in diameter. A filter paper was pressed on the liquid side of the grid (blotting) for removing excess sample solution. Immediately after liquid removal, the grid, held by tweezers, was propelled into liquid ethane. Frozen grids were stored in liquid nitrogen and transferred into a cryo-holder kept at −180° C. Sample analysis was performed in a Philips CM12 TEM at a voltage of 80 kV. Low dose procedures were applied to minimise beam damage. In some cases (FIG. 7, Examples 1, 4 and 5) a home build environmental chamber similar to the one described by Egelhaaf et al (Egelhaaf et al, J. Microsc. (2000) 200, 128-139) was used. The temperature before thinning and vitrifying was set at 25° C. and 100% humidity was used. The ISAMULSION can be identified by the presence of small bright features inside the oil droplets. FIGS. 2, 7a are Cryo-TEM micrographs of typical ISAMULSIONs showing characteristic distances between the bright features of about 7-8 nm. It should be noted that such bright features are not observed for standard non-structured emulsions and there is no contrast inside non-structured emulsion droplets (FIG. 7b).

Figure 3:
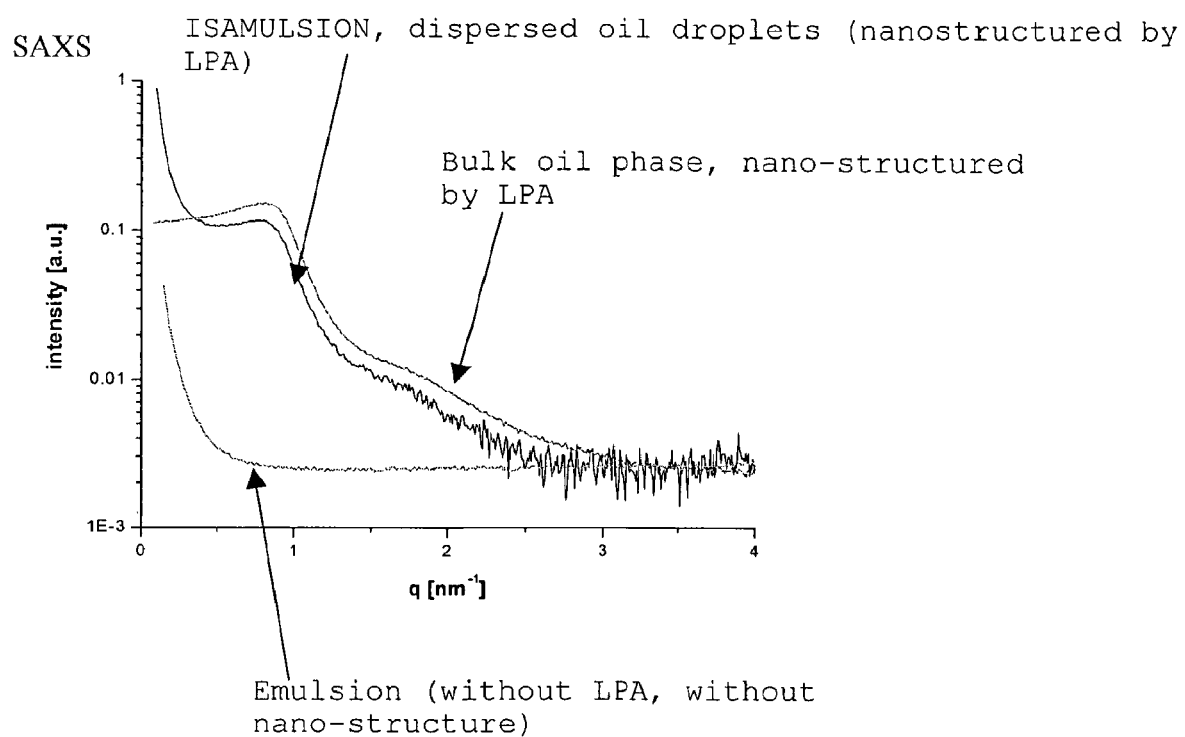
FIG. 3 shows the small angle X-ray scattering (SAXS) pattern of an ISAMULSION, of the bulk oil phase (nanostructured by LPA), which was used for making the ISAMULSION and of the corresponding ordinary emulsion (without LPA, without nano-structure). a.u. means arbitrary unit in all the figures.

The SAXS curves of FIG. 3 were obtained by a standard equipment (Bergmann et al. J. Appl. Cryst. (2000) 33, 869-875), using a X-ray generator (Philips, PW 1730/10) operating at 40 kV and 50 mA with a sealed-tube Cu anode. A Göbel mirror is used to convert the divergent polychromatic X-ray beam into a focused line-shaped beam of Cu $K_\alpha$ radiation ($\lambda$=0.154 nm). The 2D scattering pattern is recorded by an imaging-plate detector and integrated to the one-dimensional scattering function I(q) using SAXSQuant software (Anton Paar, Graz, Austria), where q is the length of the scattering vector, defined by q=($4\pi/\lambda$)sin $\theta$/2, $\lambda$ being the wavelength and $\theta$ the scattering angle. The broad peaks of scattering profiles were desmeared by fitting these data with the Generalized Indirect Fourier Transformation method (Bergmann et al. (2000), 33, 1212-1216). The characteristic distances are given by d=$2\pi$/q. FIG. 3 shows the small angle X-ray scattering patterns of an ISAMULSION (same as investigated in FIG. 2) together with the corresponding non-dispersed bulk oil phase (nano-structured by LPA) that it is made from, and the corresponding ordinary emulsion (without LPA, without nano-structure). It can be seen that the ISAMULSION shows the same peak position as the non-dispersed bulk oil phase that it is made from. The characteristic distance for both is about 7.5 nm. This characteristic distance is higher than the diameter of the hydrophilic domain. Therefore the hydrophilic domains have a size smaller than 7 nm. For the man skilled in the art, this small size of the hydrophilic domains demonstrates that the internal structure of the oil droplet is thermodynamically stable. Moreover, for the corresponding ordinary emulsion, in which no LPA is added (no nano-structure), no peak is observed. This is an additional prove of the presence of a nano-sized self-assembled structure inside the oil droplets of an ISAMULSION. It does not change upon dispersion in water, indicating that the internal ISAMULSION droplet structure is in a thermodynamic equilibrium state.

Figure 11:
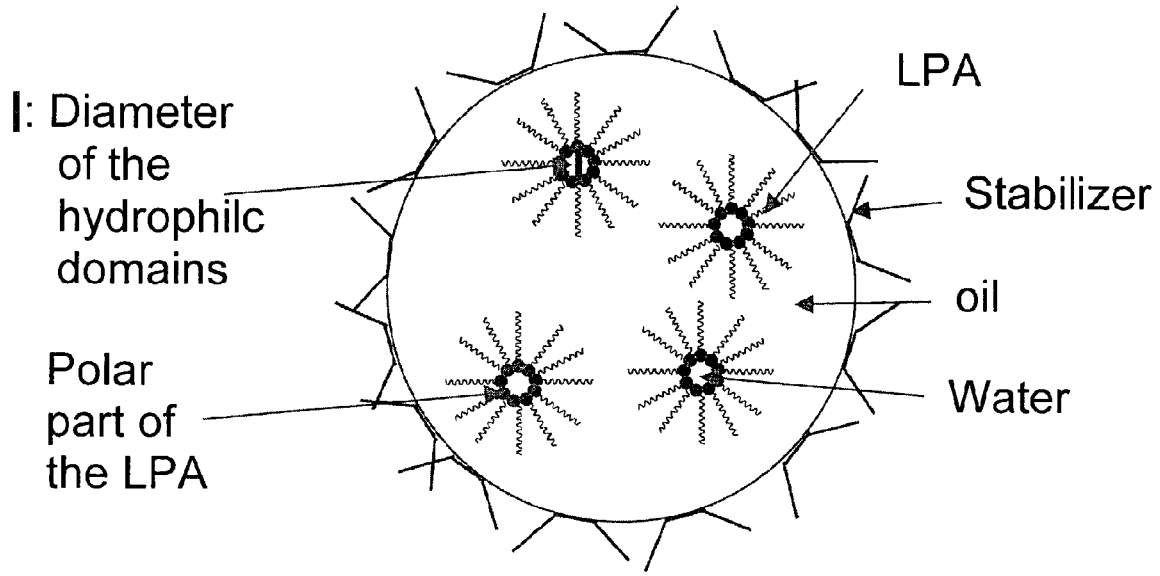
FIG. 11 shows a schematic of an Isamulsion oil droplet, which contains hydrophilic domains. Note that the hydrophilic domains can be sherical or non-spherical, i.e. rods, disks or channels.

Moreover, no change in the ISAMULSION droplet nano-structure is observable even after several months of storage of the product (see FIG. 5), indicating the thermodynamic equilibrium of the internal nano-sized self-assembly droplet structure. The reversibility of the internal structure formation in the ISAMULSION droplets upon heating and cooling (see FIG. 6) is another indication of thermodynamic equilibrium of the formed internal oil droplet nano-sized self-assembled structure. FIG. 11 shows a schematic of an oil droplet which has been nano-structured by addition of a LPA. The structural definition of a hydrophilic domain is specified in FIG. 11. Hydrophilic domains include the polar part (head group) of the LPA (and not the hydrocarbon tail region and the water part). The minimum diameter of a hydrophilic domain can be about 0.5 nm which is more or less the cross section of 2 head groups containing no water molecules. The minimum size of the polar part of a lipophilic addive or emulsifier is about 0.2 nm. The diameter of a water molecule is about 0.3 nm.

EXAMPLES

The various embodiments of this invention provide an oil-in-water emulsion in which the dispersed oil droplets exhibit a nano-sized, self-assembled structure of hydrophilic domains due to the presence of a lipophilic additive (LPA). The following examples are illustrative in nature and are not to be construed as limiting the invention, the scope of which is defined by the appended claims.

Example 1

Generic Examples of an ISAMULSION Obtained by Homogenisation

Typically 1-5 wt % of a mineral oil, such as tetradecane, was added to 95 wt % water containing already 0.375 wt % of the emulsifier (Tween 80 or Pluronic F127 from BASF). 0.5-4 wt % LPA (glycerol monolinoleate) was then added to the mixture. The total amount of lipophilic molecules (mineral oil+LPA) was 4.625 wt %.

Figure 4:
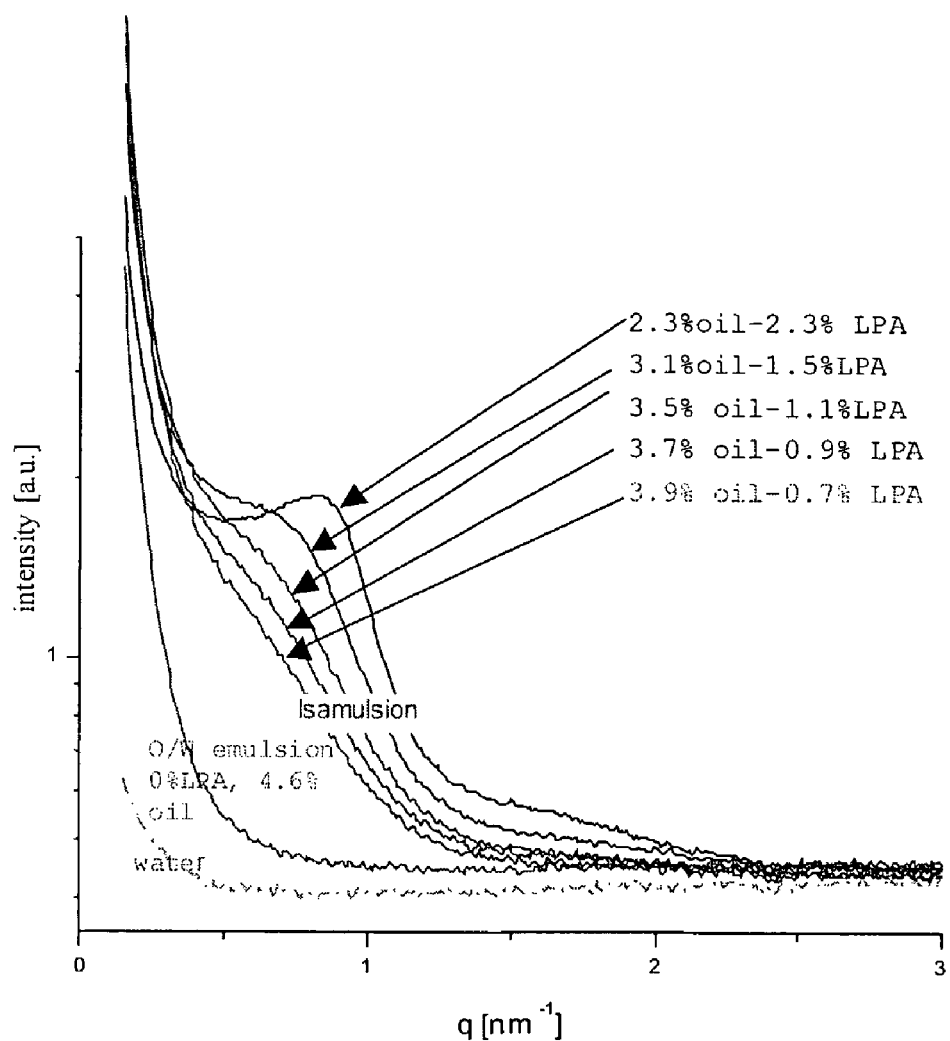
FIG. 4 shows the small angle X-ray scattering (SAXS) pattern of ISAMULSIONS containing various amounts of LPA, i.e., $\alpha$ values ($\alpha=100*$LPA/(LPA+OIL)).
Figure 5:
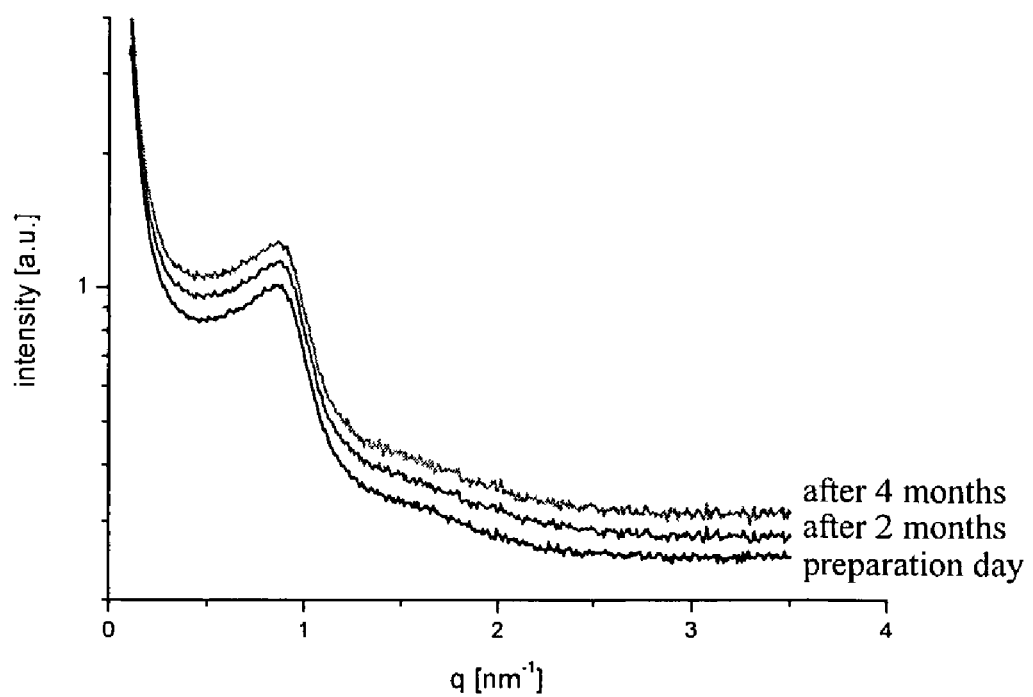
FIG. 5 shows the stability of the internal oil droplet structure over time investigated by means of small angle X-ray scattering (SAXS) (the same ISAMULSION as mentioned in FIG. 3 is investigated). Notice that after 4 months there is no change observable in the internal structure of the oil droplets forming the ISAMULSION.
Figure 6:
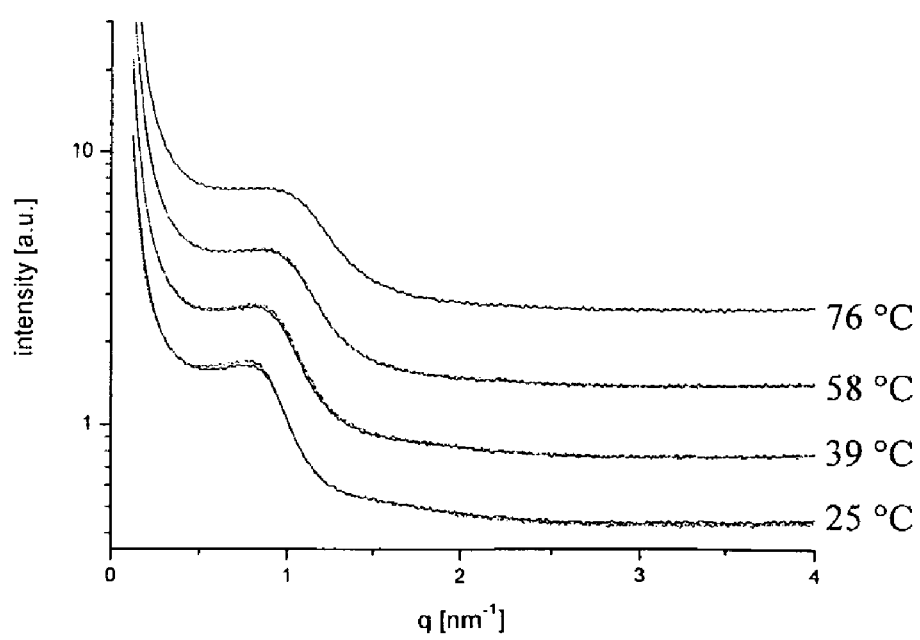
FIG. 6 shows the reversibility of the internal structure of the ISAMULSION droplets upon heating and cooling, measured by means of small angle X-ray scattering (SAXS) (Same ISAMULSION as in FIG. 3). It demonstrates the reversibility of structure formation after heating and cooling. The SAXS curves obtained during cooling to 58, 39 and 25° C. are superimposed on the SAXS curved obtained during heating to 58, 39 and 25° C., respectively.
Figure 12:
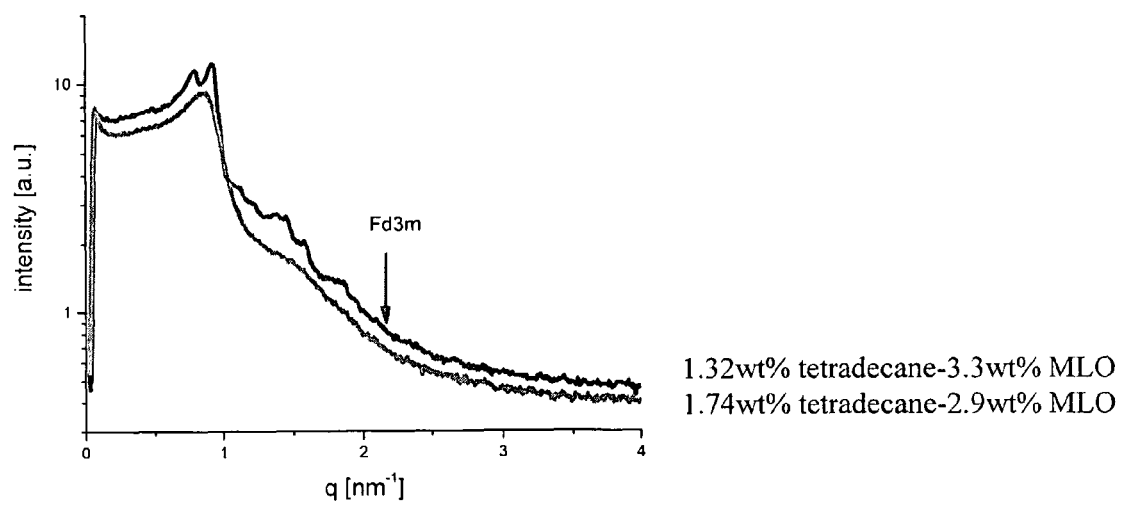
FIG. 12 shows the small angle X-ray scattering (SAXS) patterns of ISAMULSIONS containing oil droplets that have an inverse micellar cubic structure (space group fd3m).

Ultrasonication was then carried out for 20 minutes. The ISAMULSION character of the emulsions was confirmed by cryo-TEM images and SAXS curves such as the ones of FIG. 2 and FIG. 3-4. FIG. 2, FIG. 3, FIG. 5 and FIG. 6 were obtained from those generic examples with a composition of 2.4 wt % mineral oil(tetradecan)-2.2 wt % LPA-0.375 wt % primary emulsifier (pluronic F127)-95 wt % water. In addition, corresponding bulk samples (non dispersed samples containing the oil and the LPA but no emulsion stabilizer) were prepared and analysed. The weight ratio oil(tetradecan)/LPA(glycerol monolinoleate) was 1.1/1.0. The mixture oil-LPA-water was heated and mixed with a Vortex until the sample was homogeneous. After addition of 0, 5, or 10 wt % water to the oil/LPA mix, the sample was clear indicating that the water was totally solubilized into the oil/LPA mixture and a w/o microemulsion was formed. After addition of higher amounts of water, the sample shows phase separation. It was noted that the samples containing 15 and 20 wt % water show the same SAXS curves as the corresponding ISAMULSION sample (2.4 wt % mineral oil-2.2 wt % LPA-0.375 wt % emulsifier). This demonstrates that ISAMULSION droplets show the same characteristic distance of 7.5 nm as observed in the corresponding bulk phases (see FIGS. 2 and 3). FIG. 5 demonstrates that the internal structure of the ISAMULSION is stable for more than 4 months. FIG. 6 demonstrates that the ISAMULSION can be heated and cooled down to room temperature, keeping exactly the same internal structure. This demonstrates that the internal structure of the ISAMULSION oil droplets are in thermodynamic equilibrium. Moreover, FIG. 4 shows that ISAMULSIONS are formed (e.g. a peak in the SAXS curve is observed) already with relatively low LPA and high oil contents (e.g. 3.9 wt % mineral oil (tetradecan)-0.725 wt % LPA (glycerol monolinoleate), 0.375 wt % emulsifier (pluronic F127)-95% water). However an ISAMULSION is not formed when no LPA is present as shown in FIG. 3 (composition 4.625 wt % oil (tetradecan), 0.375 wt % pluronic F127, 95 wt % water). Also with higher amounts of LPA ($\alpha$ values) (Examples of composition: composition 1: 1.32 wt % tetradecan-3.3 wt % LPA-0.375 wt % Pluronic F127; composition 2: 1.75 wt % tetradecan-2.9 wt % LPA-0.375 wt % Pluronic F127), an ISAMULSION is formed. The structure is more ordered than observed with a lower $\alpha$ value (LPA content) and shows an inversed micellar cubic arrangement of the hydrophilic domains, as shown by the SAXS curves (FIG. 12).

Example 2

Generic Examples of an ISAMULSION Obtained by the Hydrotrope Route 1 wt % emulsifier (Pluronic F127) was solubilized in 89 wt % water forming the aqueous solution. 2.5 wt % mineral oil (tetradecan) and 2.5 wt % LPA (glycerol monolinoleate) were dissolved in 5 wt % ethanol forming the lipidic solution. The aqueous solution was slowly added to the lipidic solution while vortexing. At the end of the process, the ISAMULSION, i.e., droplets having an interior nano-sized self-assembled structure has spontaneously formed.

Example 3

An ISAMULSION Containing a Flavouring Oil 2 wt % of an essential oil (R+ limonene) was introduced in 95 wt % water containing already 0.4 wt % emulsifier (Pluronic F127). 2.6 wt % LPA (glycerol monolinoleate) was added to the mixture. Ultrasonication was carried out for 20 minutes. A dispersion was formed. As in the case of example 1, SAXS reveals the ISAMULSION character of the emulsion. The ISAMULSION is spontaneously formed during the ultrasonication step. This example demonstrates that flavouring oils, such as limonene, can be used as the oil phase for the formation of an ISAMULSION structure.

Example 4

An ISAMULSION Containing a Nutrient 2 wt % oil (d-alpha tocopheryl acetate) was introduced in 84.625 wt % water containing already 0.375 wt % emulsifier (Pluronic F127) and 10 wt % maltodextrin. 2.5 wt % LPA (DimodanU/J (about 62% glycerol monolinoleate, 22% glycerol monooleate, 14% saturated monoglyceride) Danisco, Danmark) and 0.5% ascorbic acid were added to the mixture. Ultrasonication was then carried out for 2 minutes. As in the case of example 1, SAXS reveals the ISAMULSION character of the emulsion. The nano-sized self-assembled structure inside the oil droplets is spontaneously formed during the ultrasonication step. This ISAMULSION can be spray or freeze dried obtaining a free flowing powder, which can be redispersed into water. This example demonstrates that nutritional oils, such as vitamin E, can be used as the oil phase for the formation of an ISAMULSION structure.

Example 5

ISAMULSIONS Using a Triglyceride Oil

ISAMULSIONS can also be formed with other oils, for instance with diglyceride or triglyceride oils. 0.5-4.5 wt % of soybean oil was mixed with 0.5-4 wt % LPA (Dimodan U/J, Danisco, Dannmark). This mixture was added to 95% water containing 0.375% of the emulsifier (Pluronic F127). The total amount of lipophilic molecules (oil+LPA) was 4.625 wt %.

The mixture was sheared using a Polytron (Kinematica, Switzerland) for five minutes.

Figure 8:
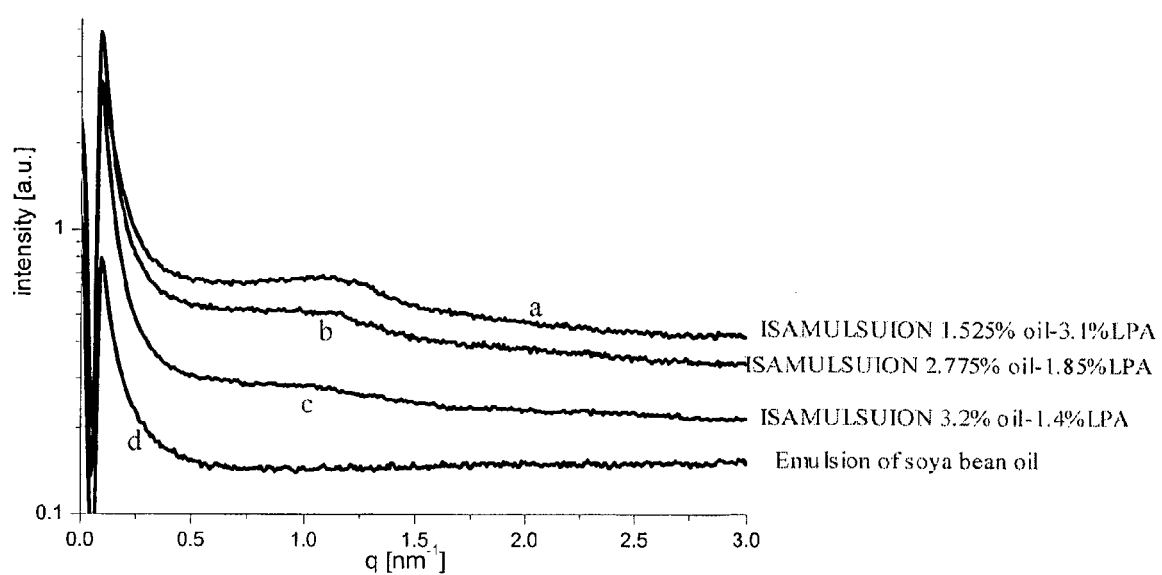
FIG. 8(a) shows the small angle X-ray scattering (SAXS) pattern of the ISAMULSION (with LPA, with nanostructure) used in FIG. 7 and (d) of the corresponding ordinary emulsion (without LPA, without nano-structure) used in FIG. 7. (b) and (c) correspond to ISAMULSIONS with high oil and low LPA content.

The ISAMULSION character of the emulsions was confirmed by cryo-TEM images (FIG. 7a), SAXS (FIG. 8a) and examination of the corresponding bulk samples (as it was done for example 1). FIGS. 7a-8a were obtained from those generic examples with a composition of 1.525 wt % triglyceride oil-3.1 wt % LPA-0.375 wt % primary emulsifier (pluronic F127)-95 wt % water. SAXS shows that ISAMULSIONS are formed also for lower LPA contents, such as for 2.775 wt % triglyceride oil and 1.85 wt % LPA in the presence of 0.375 wt % primary emulsifier (pluronic F127) and 95 wt % water (FIG. 8b) and for 3.2375 wt % triglyceride oil-1.3875 wt % LPA-0.375 wt % primary emulsifier (pluronic F127)-95 wt % water (FIG. 8c). No internal structure is observed inside ordinary soybean oil droplets, e.g. in the absence of LPA (FIG. 7b; FIG. 8d).

Figure 9:
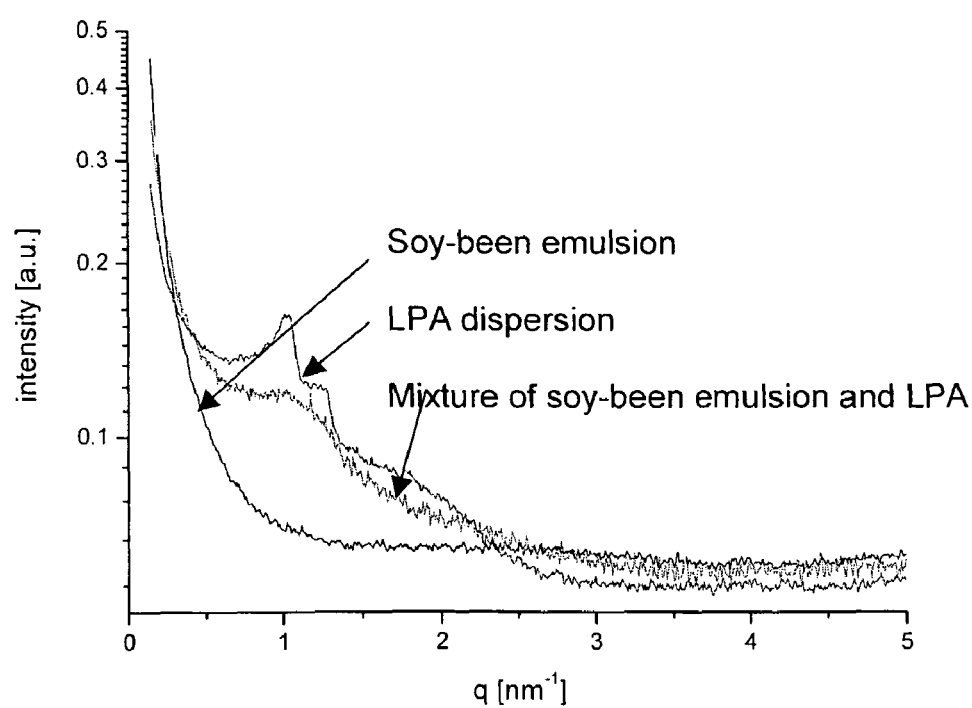
FIG. 9 shows the small angle X-ray scattering (SAXS) of a dispersion containing only LPA, of a normal emulsion containing oil (and no LPA), of an ISAMULSION obtained by mixing and homogenising 60% of the LPA dispersion and 40% of the normal emulsion.

In FIG. 9, the SAXS curves of 3 different dispersions are given: (i) of a dispersion containing only LPA and emulsifier (4.625 wt % LPA-0.375% emulsifier-95% water), (ii) of a normal emulsion containing oil and no LPA (4.625 wt % oil-0.375% emulsifier-95% water) and (iii) of a mixture of the dispersion (i) and (ii), namely 60% of (i) and 40% of (ii). The mixture (iii) was mixed 5 minutes by means of a Polytron. The SAXS curve of the mixture (iii) (FIG. 9) shows that the internal structure of the mixture is very different from the LPA dispersion (i) and from the normal emulsion (ii) (FIG.

8a). This demonstrates that the obtained internal structure of the ISAMULSION droplets is not dependent on the sequence of mixing and processing.

Example 6

Figure 10:
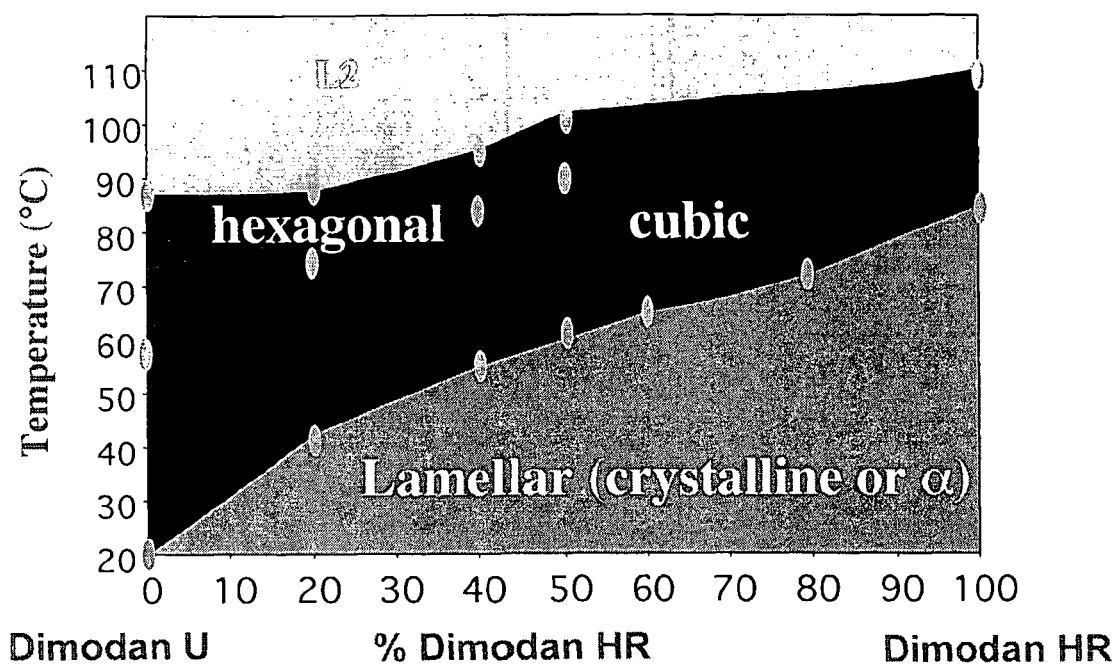
FIG. 10 shows the pseudo binary phase diagram of a saturated-unsaturated monoglyceride mixture in the presence of 20% water.

An ISAMULSION Containing a Mixture of 2 LPA's, Namely a Saturated and Unsaturated Monoglyceride 0-1.8% mineral oil (tetradecan) was added to 0.2-2% LPA. The LPA was a mixture of saturated monoglycerides (Dimodan HR, (saturated monoglycerides containing 90% of glycerol monostearate), Danisco, Denmark) and unsaturated monoglycerides (Dimodan U/J, Danisco, Denmark). The total amount of lipophilic molecules (Oil+LPA) was 3%. The mixture was added to 96.7% water containing 0.3% Tween 80 as emulsifier. Ultrasonication was carried out for 2 minutes. As indicated by the pseudo binary phase diagram of the saturated monoglyceride (Dimodan HR)-unsaturated monoglyceride (Dimodan U) mixture obtained at 20% water (FIG. 10), the formation of a stable L2 phase can be obtained at high temperatures after addition of the saturated monoglyceride to the unsaturated monoglyceride sample, indicating that L2 based ISAMULSIONS can be formed at high temperatures. For example, for the compositions 1% tetradecan-1% saturated monoglycerides-1% unsaturated monoglycerides-0.3% Tween 80 and 1% tetradecan, ISAMULSIONS are present and stable at temperatures higher than 60° C.

Example 7

ISAMULSIONS made of a Monoglyceride (MLO) and Diglycerol Monooleate (DGMO)

Mixtures containing mineral oil (tetradecan), glycerol monolinoleate and diglycerol monooleate (DGMO) was added to 95.375 wt % water containing already 0.375 wt % emulsifier (Pluronic F127). Ultrasonication was then carried out for 20 minutes.

Figure 13:
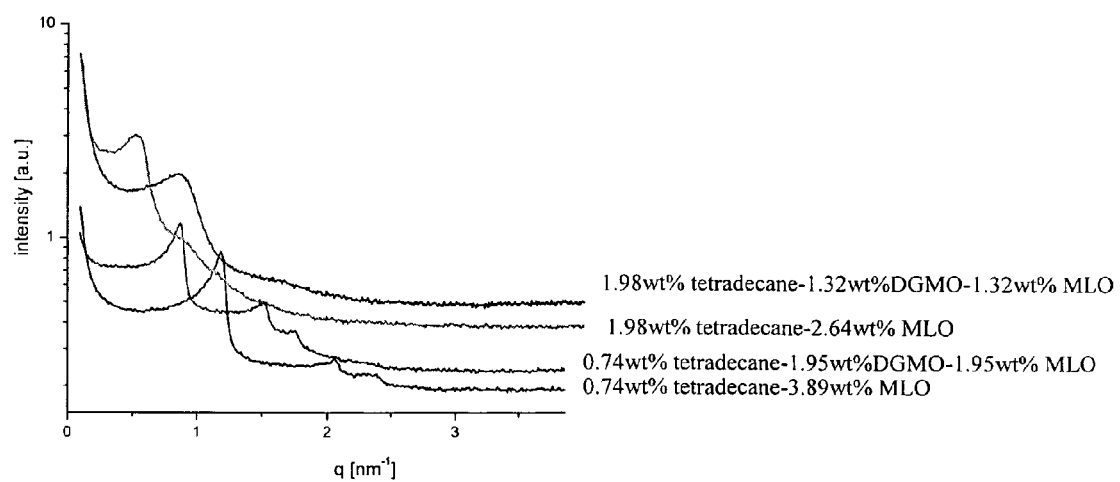
FIGS. 13-15 show the small angle X-ray scattering (SAXS) patterns of ISAMULSIONS made with a mixture of monolinolein (MLO) and di-glycerol monooleate (DGMO) as the LPA.
Figure 14:
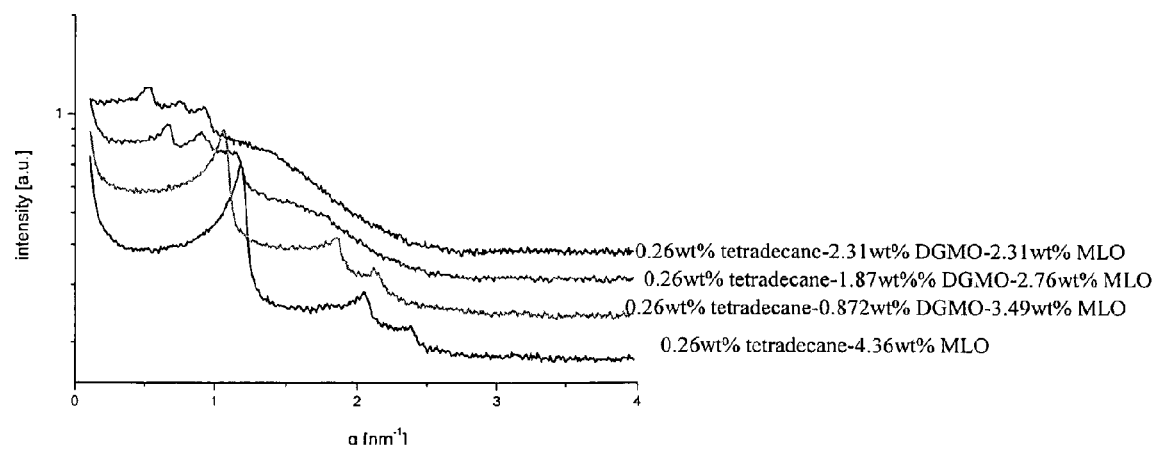
Figure 15:
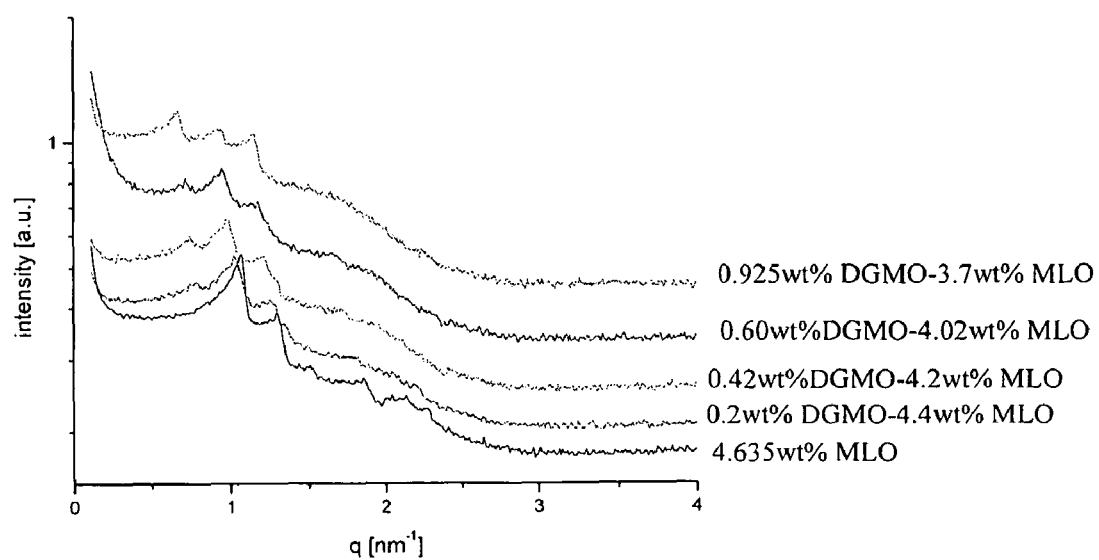

SAXS reveal the ISAMULSION character of the mixtures (FIG. 13-15). Compared to ISAMULSIONS made only with glycerol monooleate and without DGMO (FIG. 13-15), the SAXS peaks are shifted towards higher distances, when DGMO is used, demonstrating that the hydrophilic domains are getting larger and that a higher amount of water can be solubilized in the droplets in the presence of DGMO. This example demonstrates that mixtures of different LPA's can be used to form the characteristic structure of ISAMULSION oil droplets and that the characteristic hydrophilic domain size can be tuned by adjusting the used LPA.

Example 8

ISAMULSIONS made of a Monoglyceride and a Phospholipid

Mixtures containing mineral oil (tetradecan), phosphatidilcholine from soya oil (PC) and monolinolein (MLO) was added to 95.375 wt % water containing already 0.375 wt % emulsifier (Pluronic F127). Ultrasonication was then carried out for 20 minutes.

Figure 16:
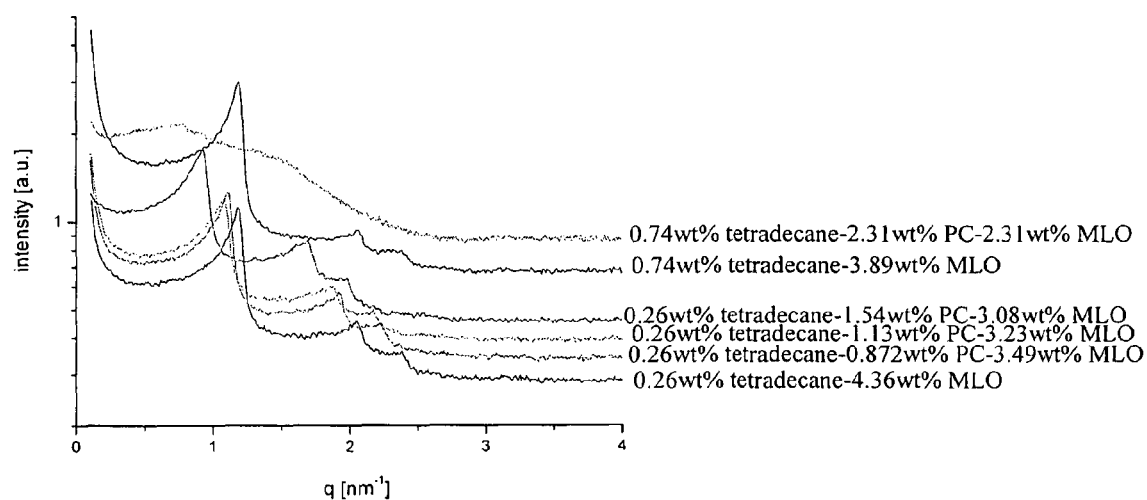
FIG. 16 shows the small angle X-ray scattering (SAXS) patterns of ISAMULSIONS made with a mixture of phospholipids (phospatidylcholine (PC)) and monolinolein (MLO) as the LPA.

SAXS reveals the ISAMULSION character of the mixtures (FIG. 16). This example demonstrates that phospholipids can be used to form the characteristic structure of ISAMULSION oil droplets.

Example 9

Solubilization of Molecules which are only Sparingly Soluble in the Oil at Room Temperature A mixture of 1.1 wt % soya oil, 0.3 wt % free phytosterol (ADM, USA) and 1.7 wt % LPA (Dimodan U) was heated to 130° C. till the solution was clear. It is then cooled down to 80° C. and added to a 0.2% Tween 80 solution at 80° C. Ultrasonication was performed for 2 minutes. The dispersion was cooled down to room temperature. No lumps and no (or very few) crystals were evidenced by polarized microscopy. The reference emulsion system (oil contains no LPA, 2.8 wt % soya oil-0.31 phytosterol-0.2 wt % tween 80) showed lots of phytosterol crystals having a size up to the millimeter range, as observed under the polarized microscope. This example demonstrates that crystalline lipophilic ingredients or nutrients can be solubilized in the interior of the structure of ISAMULSION oil droplets in their molecular form slowing down or preventing their recrystallisation.

Example 10

An ISAMULSION Containing Polysaccharides 1.2 wt % Soya oil-1.7% Dimodan U (LPA)-0.0075 wt % Dextran from Fluka (molecular weight of 1500 D)-0.14 wt % water was first mixed, heated and homogenized with a vortex till a homogeneous clear solution was formed. This solution was added to 96.75 wt % water in which 0.2 wt % Tween 80 was dispersed. The mixture was treated by ultrasonication for 2 minutes. An ISAMULSION was formed. This example demonstrates that polymeric molecules can be solubilized in the ISAMULSION.

Example 11

An ISAMULSION Containing an Amino Acid 0.51 wt % Soya oil-2.49 wt % Dimodan U (LPA)-0.01 wt % L-Leucine-0.5 wt % water was first mixed, heated and homogenized with a vortex till forming an homogeneous clear solution. This solution was added to 96.29 wt % water in which 0.2 wt % Tween 80 was dispersed. The mixture was treated by ultrasonication for 2 minutes. An ISAMULSION was formed.

Example 12

An ISAMULSION Containing a Sugar 0.02 wt % Soya oil-2.98% Dimodan U (LPA)-0.02 wt % xylose-0.35 wt % water was first mixed, heated and homogenized with a vortex and let cooled down to room temperature. This solution was added to 96.43 wt % water in which 0.2 wt % Tween 80 was dispersed. The mixture was treated by ultrasonication for 2 minutes. An ISAMULSION was formed. This example demonstrates that hydrophilic ingredients can be solubilized in the ISAMULSION.

Example 13

An ISAMULSION Containing an Antioxidant 0.51 wt % soybean oil-2.49 wt % Dimodan U (LPA)-0.03 wt % Lyc-O-Mato from Lycored (contains 10% of lycopene) were first heated and mixed with a vortex till the formation of a homogeneous solution. The solution was added to 96.77 wt % water in which 0.2 wt % Tween 80 was dissolved. The mixture was treated by ultrasonication for 2 minutes. An ISAMULSION was formed having the lycopene solubilized in the interior nanostructure of the oil droplets. This example demonstrates that lipophilic antioxidants can be solubilized in the interior of the structure of ISAMULSION oil droplets giving rise to a homogeneous emulsion.

Example 14

Figure 17:
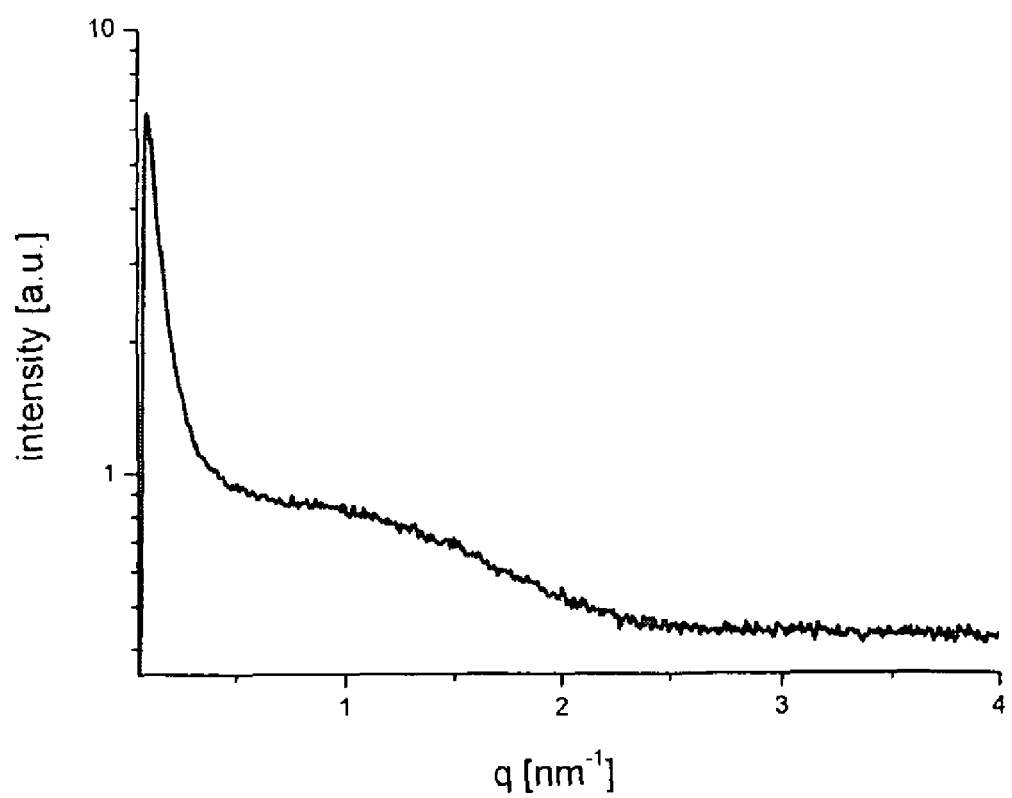
FIG. 17 shows the small angle X-ray scattering (SAXS) patterns of an ISAMULSION made with a phospatidylcholine (PC) as the LPA and triolein as the oil phase. The composition of the emulsion was 95 wt % water-1.912 wt % triolein-2.643 wt % phosphatidylcholine (PC) from soybean, (Epikuron 200 from Lucas Meyer; LPA)-0.375 wt % Pluronic F127.
Figure 18:
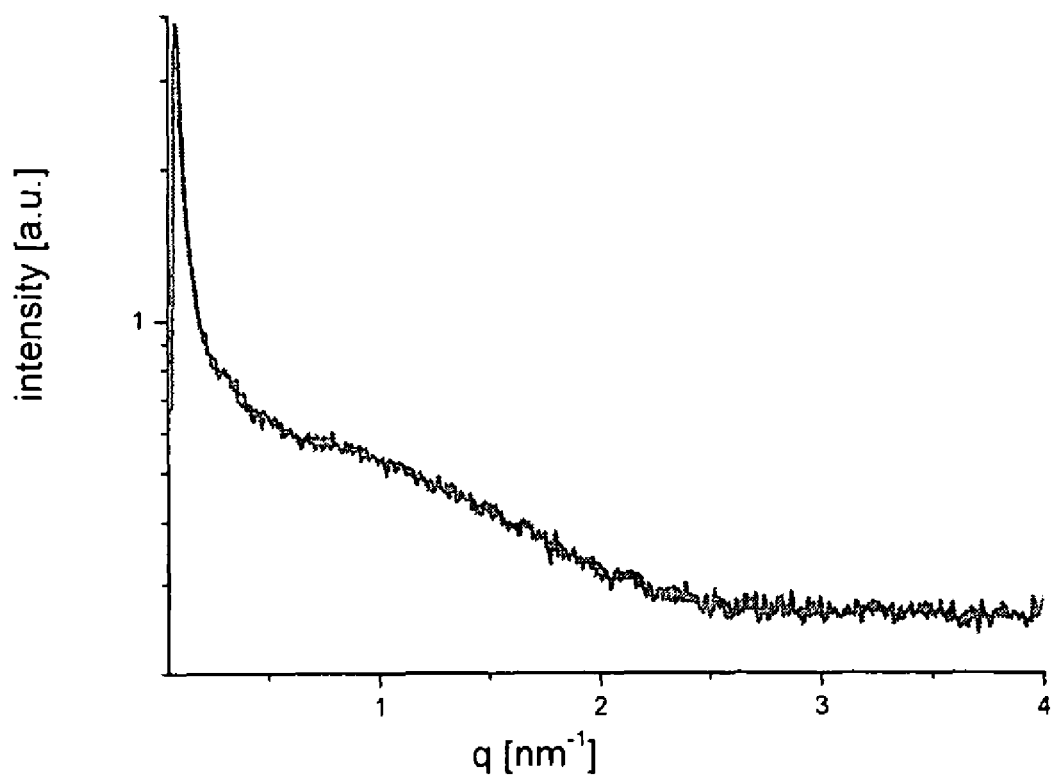
FIG. 18 shows the small angle X-ray scattering (SAXS) patterns of an ISAMULSION made with a phospatidylcholine (PC) as the LPA and vitamin E as the oil phase. The composition of the emulsion was 95 wt % water-1.912 wt % vitamin E acetate-2.643 wt % phosphatidylcholine (PC) from soybean, (Epikuron 200 from Lucas Meyer; LPA)-0.375 wt % Pluronic F127.

An ISAMULSION Using Phosphatidylcholine (PC) as LPA 0.1912 g of triolein-0.2643 g phosphatidylcholine (PC) from soybean, (Epikuron 200 from Lucas Meyer; LPA)-were mixed together with 9.5 g water and 0.0375 g of Pluronic F127 (emulsifier), and ultrasonicated for 20 minutes. The resulting emulsion had the features of an ISAMULSION, i.e., droplets having an interior nano-sized self-assembled structure that has spontaneously formed, as revealed by SAXS (see FIG. 17). An ISAMULSION is also obtained if 0.1912 g of vitamin E acetate-0.2643 g phosphatidylcholine (PC) from soybean, (Epikuron 200 from Lucas Meyer; LPA)-were mixed together with 9.5 g water and 0.0375 g of Pluronic F127 (emulsifier), and ultrasonicated for 20 minutes (FIG. 18).

Example 15

An ISAMULSION Using Phospholipid Mixtures as LPA and a Mixture of Different Oils 2.2 wt % egg-yolk soybean phosphatidylcholine (Lucas Meyer) was mixed with 2.2 wt % diolein and 0.6 wt % tetradecane. This mixture was added to 94.625 wt % water containing 0.375 wt % of the emulsifier (Pluronic F127). Ultrasonication was then carried out for 40 minutes. An emulsion having the typical ISAMULSION features was formed. The PC can also be mixed with phopshatidylethanolamine (PE) or another Phospholipid in order to obtain the ISAMULSION features. Any combination of different phospholipids and oils is possible to use and generating the typical ISAMULSION features described in this invention.

Example 16

An ISAMULSION Using Phosphoethanolamine (PE) as LPA and Oil 2.2 wt % 1,2-Dioleoyl-sn-Glycero-3-Phosphoethanolamine (AvantiPolar Lipids) was mixed with 0.8 wt % soybean oil. This mixture was added to 96.7 wt % water containing 0.3 wt % of the emulsifier (Pluronic F127). Ultrasonication was then carried out for 40 minutes. An emulsion having the typical ISAMULSION features was formed.

In all the described examples, the size of the hydrophilic domains in the dispersed emulsion droplets is in the range of 0.5 nm to 15 nm.

The ISAMULSIONS prepared according to the above mentioned examples can be used as such or as an additive.

Having now fully described the invention, it will be understood by those of ordinary skill in the art that the same can be performed within a wide and equivalent range of conditions, formulations and other parameters without affecting the scope of the invention or any embodiment thereof.

The invention claimed is:

1. An oil-in-water emulsion comprising oil droplets of a diameter in the range of 5 nm to hundreds of micrometers, the droplets having an interior comprising nano-sized self-assembled structures with hydrophilic domains having a diameter size in the range of 0.5 to 200 nm due to a presence of a lipophilic additive, wherein the emulsion comprises an oil selected from the group consisting of mineral oils, hydrocarbons, vegetable oils, waxes, alcohols, fatty acids, mono-, di-, tri-acylglycerols, essential oils, flavouring oils, lipophilic vitamins, esters, neutraceuticals, terpins, terpenes and mixtures thereof;
a lipophilic additive having a resulting Hydrophilic-Lipophilic Balance value lower than about 10;
hydrophilic domains in form of droplets or channels; and
an aqueous continuous phase that comprises at least one of emulsion stabilizers and emulsifiers.

2. An oil-in-water emulsion comprising oil droplets of a diameter in the range of 5 nm to hundreds of micrometers, the droplets having an interior comprising nano-sized self-assembled structures with hydrophilic domains having a diameter size in the range of 0.5 to 200 nm due to a presence of a lipophilic additive, wherein the oil droplets have an internal structure selected from the group consisting of L2 structure and a combination of L2 and oil structure in the temperature range of 9° C. to 100° C.

3. An oil-in-water emulsion comprising oil droplets of a diameter in the range of 5 nm to hundreds of micrometers, the droplets having an interior comprising nano-sized self-assembled structures with hydrophilic domains having a diameter size in the range of 0.5 to 200 nm due to a presence of a lipophilic additive, wherein the oil droplets have an L2 internal structure in the temperature range of 0° C. to 100° C.

4. An oil-in-water emulsion comprising oil droplets of a diameter in the range of 5 nm to hundreds of micrometers, the droplets having an interior comprising nano-sized self-assembled structures with hydrophilic domains having a diameter size in the range of 0.5 to 200 nm due to a, presence of a lipophilic additive, wherein the oil droplets have an internal structure selected from the group consisting of L2 structure, LC structure, and a combination of L2 and LC structures in the temperature range of 0° C. to 100° C.

5. An oil-in-water emulsion comprising oil droplets of a diameter in the range of 5 nm to hundreds of micrometers, the droplets having an interior comprising nano-sized self-assembled structures with hydrophilic domains having a diameter size in the range of 0.5 to 200 nm due to a presence of a lipophilic additive, wherein the oil droplets have a LC internal structure in the temperature range of 0° C. to 100° C.

6. An oil-in-water emulsion comprising oil droplets of a diameter in the range of 5 nm to hundreds of micrometers, the droplets having an interior comprising nano-sized self-assembled structures with hydrophilic domains having a diameter size in the range of 0.5 to 200 nm due to a presence of a lipophilic additive, wherein the oil droplets have an internal structure selected from the group consisting of L3 structure, a combination of L2 and L3 structure, a combination of La and L2 structure, and a combination of lamellar crystalline structure and L2 structure in the temperature range of 0° C. to 100° C.

7. The oil-in-water emulsion according to claim 1 comprising dispersed oil droplets having a nano-sized self-assembled structured interior comprising mixtures of lipophilic and hydrophilic additives.

8. The oil-in-water emulsion according to claim 1, wherein the hydrophilic domains in form of droplets or channels comprise a material selected from the group consisting of water, a non-aqueous polar liquid, and combinations thereof.

* * * * *